United States Patent
Gianchandani et al.

(10) Patent No.: US 7,157,718 B2
(45) Date of Patent: Jan. 2, 2007

(54) MICROFABRICATED RADIATION DETECTOR ASSEMBLIES METHODS OF MAKING AND USING SAME AND INTERFACE CIRCUIT FOR USE THEREWITH

(75) Inventors: Yogesh B. Gianchandani, Ann Arbor, MI (US); Chester G. Wilson, Ypsilanti, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 253 days.

(21) Appl. No.: 10/837,068

(22) Filed: Apr. 30, 2004

(65) Prior Publication Data

US 2005/0242291 A1 Nov. 3, 2005

(51) Int. Cl.
  *G01T 1/18* (2006.01)
(52) U.S. Cl. .................. 250/374; 250/385.1
(58) Field of Classification Search ............... 250/374, 250/375, 376, 377, 338.4, 385.1, 370.01
  See application file for complete search history.

(56) References Cited

U.S. PATENT DOCUMENTS

| | | | | |
|---|---|---|---|---|
| 5,113,074 A | * | 5/1992 | Sferlazzo | 250/492.2 |
| 5,298,754 A | * | 3/1994 | Anderson et al. | 250/379 |
| 5,343,047 A | * | 8/1994 | Ono et al. | 250/492.21 |
| 5,500,534 A | * | 3/1996 | Robinson et al. | 250/385.1 |
| 5,594,346 A | * | 1/1997 | Stearns et al. | 324/464 |
| 5,614,772 A | * | 3/1997 | Butow et al. | 307/119 |
| 5,731,584 A | * | 3/1998 | Beyne et al. | 250/374 |
| 6,046,454 A | * | 4/2000 | Lingren et al. | 250/370.01 |
| 6,362,484 B1 | * | 3/2002 | Beyne et al. | 250/374 |
| 6,546,070 B1 | * | 4/2003 | Francke | 378/51 |
| 2002/0139935 A1 | * | 10/2002 | Klein et al. | 250/390.01 |
| 2004/0124356 A1 | * | 7/2004 | Scholtz et al. | 250/310 |

OTHER PUBLICATIONS

Audet, S.A., et al., High-Purity Silicon Soft X-Ray Imaging Sensor, Sensors and Actuators (A22) Nos. 1-3, Mar. 1990, pp. 482-486 (Abstract only included).
Wunstorf, R., Radiation Hardness of Silicon Detectors: Current Status, IEEE Transactions On Nuclear-Science, (44) Nos. 3, Jun. 1997, pp. 806-814.
Bertolucci, E., et al., BETAview: A Digital β-Imaging System for Dynamic Studies of Biological Phenomena, Nucl. Inst. and Methods, A381, 1996, pp. 527-530.
Price, W.J., Nuclear Radiation Detection, McGraw-Hill, 1964, p. 123.
Charpak, G., et al., Microgas, A Multipurpose Gaseous Detector, Nucl. Inst. and Methods, A478, 2002, pp. 26-36.
Knoll, G.F., Radiation Detection and Measurement, John Wiley and Sons, 2000, pp. 161, 180.
Wilson, C.G., et al., Profiling and Modeling of DC Nitrogen Microplasmas, Jour. of Applied Physics, 94(5), Sep. 2003, pp. 2845-2851.

* cited by examiner

*Primary Examiner*—David Porta
*Assistant Examiner*—Faye Boosalis
(74) *Attorney, Agent, or Firm*—Brooks Kushman P.C.

(57) ABSTRACT

Microfabricated, gas-filled radiation detector assemblies, methods of making and using same and interface circuit for use therewith are provided. The assembly includes a micromachined radiation detector including a set of spaced-apart electrodes and an ionization gas between the electrodes. A housing has a chamber for housing the detector including the gas. The housing of the assembly also includes a window which allows passage of charged particles therethrough to ionize the gas to create electrons which, in turn, create an electron cascade in the gas between the electrodes when the set of electrodes is biased.

36 Claims, 7 Drawing Sheets

MICROFABRICATED RADIATION DETECTOR ASSEMBLIES METHODS OF MAKING AND USING SAME AND INTERFACE CIRCUIT FOR USE THEREWITH

STATEMENT REGARDING FEDERALLY SPONSORED RESEARCH OR DEVELOPMENT

This invention was made with Government support under Award No. EEC-9986866, awarded by NSF-ERC. The Government has certain rights in the invention.

BACKGROUND OF THE INVENTION

1. Field of the Invention

This invention relates to microfabricated, gas-filled radiation detector assemblies, methods of making and using same and interface circuit for use therewith.

2. Background Art

The following references are noted herein:

[1] S. A. Audet et al., "High-Purity Silicon Soft X-Ray Imaging Sensor," SENSORS AND ACTUATORS, (A22) Nos. 1–3, March 1990, pp. 482–486.

[2] R. Wunstorf, "Radiation Hardness of Silicon Detectors: Current Status," IEEE TRANSACTIONS ON NUCLEAR SCIENCE, (44) Nos. 3, June 1997, pp. 806–14.

[3] E. Bertolucci et al., "BETAview: A Digital β-Imaging System for Dynamic Studies of Biological Phenomena," NUCL. INST. AND METHODS, A381, 1996, pp. 527–530.

[4] W. J. Price, "Nuclear Radiation Detection," McGraw-Hill, 1964, p. 123.

[5] G. Charpak et al., "Micromegas, A Multipurpose Gaseous Detector," NUCL. INST. AND METHODS, A478, 2002, pp. 26–36.

[6] G. F. Knoll, "Radiation Detection and Measurement," JOHN WILEY AND SONS, 2000, pp. 161, 180.

[7] C. G. Wilson et al., "Profiling and Modeling of DC Nitrogen Microplasmas," JOUR. OF APPLIED PHYSICS, 94(5) September 2003, pp. 2845–51.

Radioactive materials, particularly uranium, are stockpiled in large and small quantities all over the world with varying degrees of security. There is a perpetual risk of their potential use in "dirty bombs," which use conventional explosives to disperse dangerous radioactive materials. Uranium-238 naturally decays into $^{234}$Th and then $^{234m}$Pa, emitting 0.8 MeV beta particles, which are essentially high energy electrons. Other possible dirty bomb ingredients include a number of beta sources, including $^{90}$Sr and $^{204}$Tl. The former is a particularly hazardous material, as it is easily absorbed into the human body, where it displaces calcium in bone, remaining there with a radioactive half-life of 27 years. Thus, there is considerable motivation to develop miniaturized sensors for radioactive materials.

Since a few radioactive materials emit X-rays, one possibility is to exploit X-ray detectors, which have benefitted from solid-state technology in recent years [1]. Unfortunately, most radioisotopes are not sources of X-rays, and the best way to detect most of the target species for dirty bombs is through their emission of beta particles. Solid-state detectors for beta particles exist, but they are relatively large, with sizes on the order of 1 cm$^2$. They typically require cryogenic cooling to distinguish radiation type and energy, and are particularly subject to radiation damage [2]. Another type of device uses pixelated silicon structures at room temperature to provide spatial imaging of beta particle flux [3].

Figure 1:
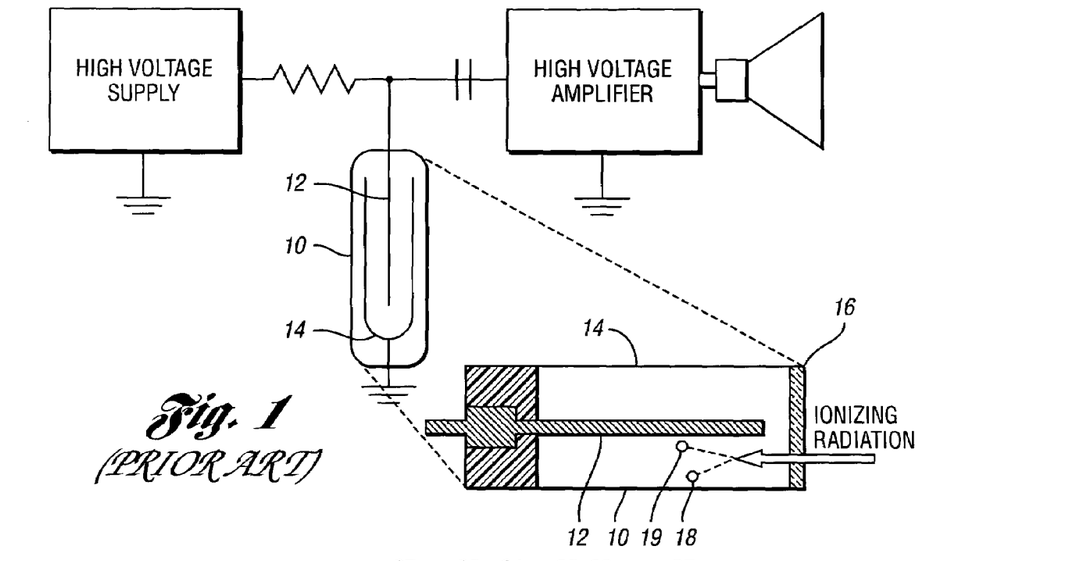
FIG. 1 is a schematic view of a prior art system including a Geiger counter having a tube under partial vacuum for detecting ionizing radiation; also, an enlarged sectional view of the tube is shown.

Geiger counters, however, are the preferred sensors for detecting beta radiation [4]. As shown in FIG. 1, typical Geiger counters utilize a tube 10 held under vacuum, with a rod-like anode 12 and concentric cathode 14. The tube 10 is biased at 500–1000 volts, and a thin window—typically mica—allows passage of beta radiation. This radiation ionizes the gas to form ions 18 and electrons 19 at some statistical rate, resulting in an avalanche breakdown, which is measured by circuitry as a "count" corresponding to one event. These gas-based detectors are very reliable, temperature insensitive, require only simple circuitry, and measure over a much wider range of radiation species and energies. Miniaturized gas-based detectors exist, but work only for detection of photon-based radiation, such as X-rays [5]. Again, as very few isotopes emit X-rays, there is a compelling need for a miniaturized beta radiation detector.

Macroscale gas-based devices have been widely used in the field of radiation detection [6]. Virtually all gas-based detectors rely on the impinging radiation ionizing the fill gas, with the resulting electrons accelerated by an electric field, ionizing more neutral species, thereby creating an avalanche breakdown. The general form of the electron density in a cascade of length x is given by:

$$n(x)=n(0)\exp(\alpha x) \tag{1}$$

Here, $\alpha$ is the first Townsend coefficient of the gas, a function of the gases ionizability, and electron capture cross-section.

Figure 3:
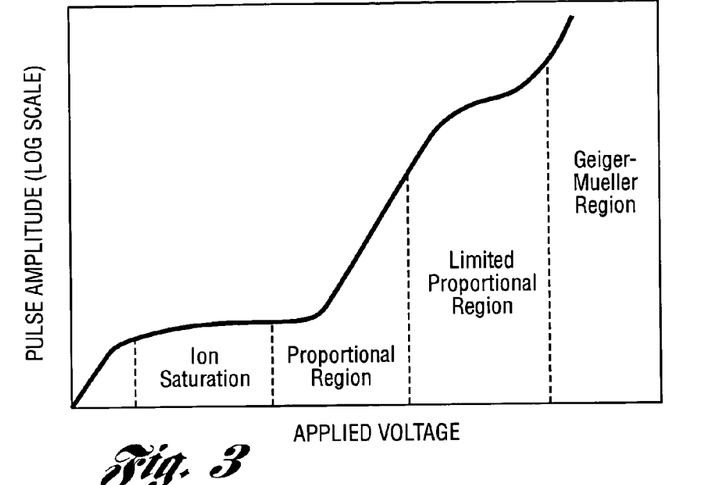
FIG. 3 is a graph of pulse amplitude versus applied voltage for gas-based radiation detectors which have four regimes of operation that are defined by the applied voltage.

Typical detectors fall into four regimes of operation, defined by the applied electric field, electrode geometry, and the pressure and species of fill gas (FIG. 3). The four regimes all have electric discharges with differing physical properties. (These regimes apply to both beta particles and photons like X-rays and gamma particles). The regime with the lowest voltage is the ion saturation region, where the only charge collected is by gas directly ionized by impinging radiation. As the voltage across the device is increased, avalanche breakdown begins to occur, and the amount of collected current increases. This is the proportional region: the amount of current is roughly proportional to the energy of impinging X-rays or gamma particles, as photon radiation is completely absorbed by the background gas. In contrast, impinging beta particles impart only a portion of their kinetic energy to the ionization of gas, so the resulting current created is not correlated to the beta energy; the proportional region is more limited for beta particles.

As the voltage is increased, the dependence of the current pulse upon the energy of the radiation is diminished even for photon radiation. This non-linearity is primarily due to the difference in mobilities between ions and electrons. In the limited proportionality regime, the much slower ions are sufficient in quantity to create a space-charge region which distorts the local electric fields. This limits the total charge, such as created by avalanching and is dependent on the electric fields. (Similar space-charge regions have been found to be the reason for lower charge densities in previously reported microplasmas [6]). As the voltage is increased further, the impinging radiation generates a self-sustaining discharge; this is the Geiger-Muller region. The total amount of current collected in this region for a cylindrical proportional counter is given by:

$$\ln M = \frac{V}{\ln(b/a)} \cdot \frac{\ln 2}{\Delta V}\left(\ln \frac{V}{pa \ln(b/a)} - \ln K\right) \quad (2)$$

Here, M is the multiplication factor, the quantity of electrons from a single incident. V is the applied voltage, a and b are the anode and cathode radii, respectively; p is the ambient gas pressure, and ΔV and K are constants of the background gas, related to electron mean free path and ionizability.

SUMMARY OF THE INVENTION

An object of the present invention is to provide gas-filled microfabricated radiation detector assemblies, methods for making and using same and an interface circuit for use therewith.

In carrying out the above object and other objects of the present invention, a microfabricated radiation detector assembly is provided. The assembly includes a micromachined radiation detector including a set of spaced-apart electrodes and an ionization gas between the electrodes. A housing has a chamber for housing the detector including the gas and a window which allows passage of charged particles therethrough to ionize the gas to create electrons which, in turn, create an electron cascade in the gas between the electrodes when the set of electrodes is biased.

The set of electrodes may divide the chamber into drift and amplification electrostatic regions when biased.

The charged particles may be beta particles and the radiation detector may be a beta radiation detector.

The electrostatic regions may be ring-shaped.

The set of electrodes may include an inner cathode and an outer anode.

The drift electrostatic region may be substantially larger than the amplification electrostatic region.

The radiation detector may include a semiconductor wafer micromachined to form the electrodes.

The housing may include at least one glass wafer connected to the semiconductor wafer to seal the ionization gas in the chamber, and the window may be a glass window.

The ionization gas in the chamber may include one or more gases.

The one or more gases may be at atmospheric pressure.

The assembly may be lithographically microfabricated.

The assembly may further include pixelated structures formed on an outer surface of the housing to provide spatial imaging of charged particle flux.

Further in carrying out the above object and other objects of the present invention, a microfabricated radiation detector assembly capable of operating spectroscopically is provided. The assembly includes a plurality of micromachined radiation detectors. Each of the detectors includes a set of spaced-apart electrodes and an ionization gas between the electrodes. A housing has a plurality of chambers for housing the detectors including the gas and a plurality of windows which allows passage of charged particles therethrough to ionize the gas to create electrons which, in turn, create electron cascades in the gas between each set of electrodes when the sets of electrodes are biased.

Each set of spaced apart electrodes may divide one of the chambers into drift and amplification electrostatic regions when biased.

The charged particles may be beta particles and each of the radiation detectors may be a beta radiation detector.

Each detector may include a semiconductor wafer micromachined to form one of the sets of electrodes.

The electrostatic regions may be ring-shaped.

Each set of electrodes may include an inner cathode and an outer anode.

Each drift electrostatic region may be substantially larger than each amplification electrostatic region.

The housing may include at least one glass wafer connected to each semiconductor wafer to seal the ionization gas in the chambers, and the windows may be glass windows.

The ionization gas in each of the chambers may include one or more gases.

The one or more gases may be at atmospheric pressure.

The assembly may be lithographically microfabricated.

The assembly may further include pixelated structures formed on an outer surface of the housing to provide spatial imaging of charged particle flux.

The chambers and the windows of the housing may be arranged to sequentially allow passage of charged particles therethrough.

The chambers and the windows may be further arranged to allow the passage of charged particles therethrough in parallel.

Still further in carrying out the above object and other objects of the present invention, a method for detecting charged particles is provided. The method includes positioning a micromachined radiation detector assembly to receive the charged particles. The assembly includes a micromachined radiation detector including a set of spaced-apart electrodes and an ionization gas between the electrodes. The assembly further includes a housing having a chamber for housing the detector including the gas and a window which allows passage of charged particles therethrough to ionize the gas to create electrons. The method further includes biasing the set of electrodes at a level which creates a signal which can be analyzed to provide information regarding the charged particles.

The step of biasing may be performed with a DC power source, an AC power source or a pulsed power source.

Yet still further in carrying out the above object and other objects of the present invention, a method of operating a micromachined radiation detector assembly is provided. The method includes providing a microfabricated radiation detector assembly. The assembly includes a micromachined radiation detector including a set of spaced-apart electrodes and an ionization gas between the electrodes. The assembly further includes a housing having a chamber for housing the detector including the gas and having a window which allows passage of charged particles therethrough to ionize the gas to create electrons. The method further includes biasing the set of electrodes at a level which allows a continuous, self-sustaining electric discharge between the electrodes.

The step of biasing may be performed with a DC power source, an AC power source or a pulsed power source.

Still further in carrying out the above object and other objects of the present invention, a method of making a radiation detector assembly is provided. The method includes providing a plurality of wafers including at least one semiconductor wafer and micromachining the at least one semiconductor wafer to obtain at least one micromachined wafer which includes at least one set of spaced-apart electrodes. The method further includes filling space between the electrodes with an ionization gas and bonding the wafers including the at least one micromachined wafer together to form the assembly.

The step of filling may be performed after the step of bonding.

The plurality of wafers may include at least one glass wafer.

The method may further include forming a hole through the at least one glass wafer to fluidly communicate the ionization gas with the space between the electrodes.

The method may further include preventing flow of ionization gas from the space between the electrodes after the step of filling.

The method may further include forming pixelated structures on an outer surface of an outer wafer of the assembly.

Yet still further in carrying out the above object and other objects of the present invention, an interface circuit for a microfabricated radiation detector assembly including at least one set of spaced-apart, micromachined electrodes and an ionization gas between the electrodes is provided. The circuit includes an electrical power source and a discharge capacitor coupled to the power source to charge the capacitor which delivers a charge to one of the electrodes to create a self-sustaining discharge between the electrodes that terminates when the capacitor reaches a certain voltage. The circuit amplifies an output signal of the assembly.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 4a–4d are side sectional views illustrating the process flow of one embodiment of the present invention.

FIGS. 6a–6d are side sectional views illustrating part of the process flow for forming an embodiment of a microfabricated radiation detector assembly of the invention which is capable of operating spectroscopically.

FIGS. 7a–7e are side sectional view illustrating another part of the process flow wherein FIGS. 7a–7e are substantially identical to FIGS. 6a–6d, respectively, except for the formation of a through-hole in the glass wafer, G2, as shown in FIG. 7c; FIG. 7e shows etching of the silicon and removal of the oxide;

FIGS. 8a–8b are side sectional views illustrating yet another part of the process flow wherein

FIG. 9d is a side sectional view of the next step in the process flow wherein the device of FIG. 9c is filled with an ionizing gas and the through-holes are filled with solder balls to encapsulate the gas;

DETAILED DESCRIPTION OF THE PREFERRED EMBODIMENTS

Figure 2A:
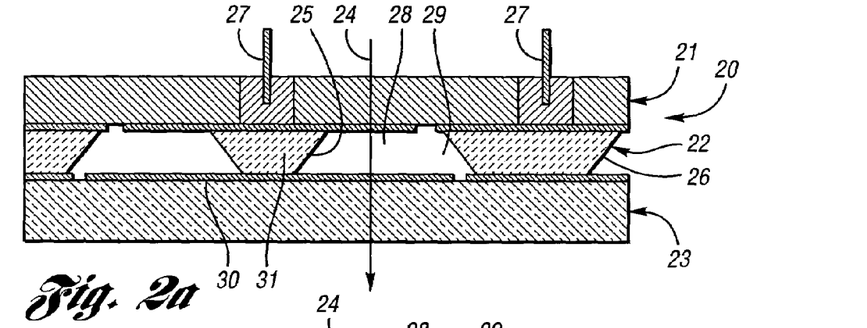
FIG. 2a is a schematic view, partially broken away and in cross-section, of one embodiment of a microfabricated radiation detector assembly of the present invention.
Figure 2B:
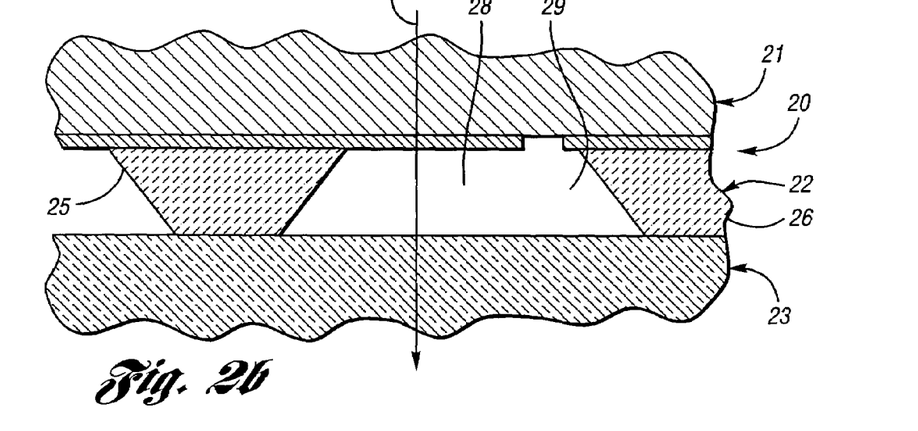
FIG. 2b is an enlarged view, partially broken away and in cross-section, of a portion of the assembly of FIG. 2a which illustrates a drift region and electron cascade between the micromachined anode and cathode of the assembly.

As described herein, one embodiment of a microfabricated radiation detector assembly of the present invention is preferably fabricated from a glass-Si-glass stack, generally indicated at 20, of wafers 21, 22 and 23, respectively, as shown in FIGS. 2a and 2b. As a beta particle or radiation passes through, as indicated by arrow 24, a bias applied between two enclosed electrodes 25 and 26 (i.e., cathode 25 and anode 26 micromachined from the silicon wafer 22) generates electron cascades in the gas between them near the anode 26. This results in a current pulse or "count."

While not shown, a single die of 2 cm$^2$ may have six or more independent chambers ranging in size from 8×8 mm to 1×3 mm. He, Ne, and a He/Air mixture, which have different voltage bias requirements, may be used as background gases. Counting rates are lower in a Ne background gas than in He, but Ne is more suitable for packaging. In tests, the device was found to detect incident beta particles from a uranium-238 source. Counting rates of up to 22 counts/min were measured. As with conventional Geiger counters, the rates varied inversely with distance from the source. The microGeiger was tested with pure He and Ne background gas with $^{90}$Sr, $^{60}$Co, and $^{204}$Tl, all beta-emitting isotopes. Rates up to 24 counts/min. were measured.

Referring again to FIGS. 2a and 2b, the first embodiment of the assembly of the invention is fabricated by anodic bonding the glass-silicon-glass stack 20, wherein the silicon is EDP etched to form an anode-cathode configuration. When DC power is applied to electrical connections 27, two electrostatic regions are formed: a drift region 28 and an amplification region 29. As beta particles 24 pass through the glass window of the glass wafer 21 into the drift region 28, they ionize the background gas. The electrons are slowly accelerated into the amplification region 29. In the amplification region 29, the electrons are quickly accelerated through a higher field region resulting in an electron cascade. Designing the drift region 28 to be much larger than the amplification region 29, as shown in FIG. 2b, allows consistent pulses that are not a function of the entry position of the beta particle 24. Also shown in FIG. 2a is optional metal at 30 and an optional mounting post 31.

For the characteristic dimensions, and gas species of one embodiment of the present invention, a cylindrical configuration would provide an M, multiplication factor ranging from 10 to $10^5$ as the operating voltages are varied. The actual multiplication of the assembly is in the range of $1-2\times10^{13}$. This is because the assembly operates in the Geiger-Muller regime, where the initial charge multiplication is further amplified by secondary emission from the anode. This serves as compensation for the small size of the assembly, in which the amplification region is smaller than in traditional devices.

Device Fabrication

Figure 4A:
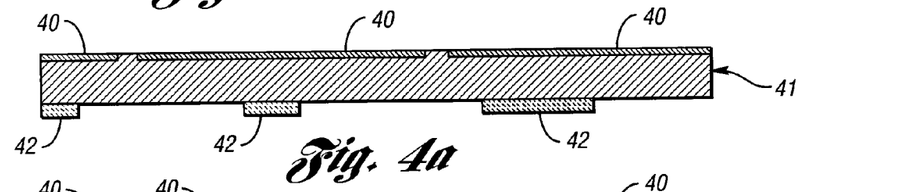
FIG. 4a illustrates a boron implanted, oxidized silicon wafer.
Figure 4B:
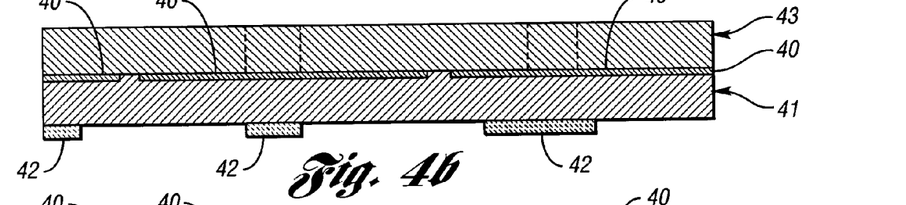
FIG. 4b illustrates the silicon wafer bonded to a glass wafer.
Figure 4C:
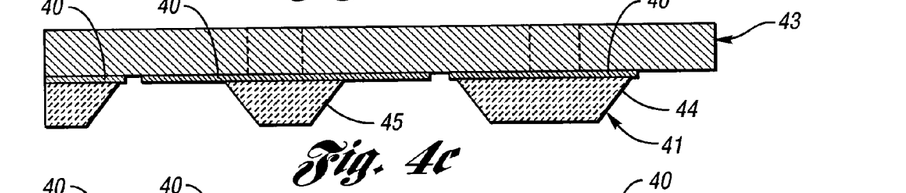
FIG. 4c illustrates EDP etching of the silicon wafer.
Figure 4D:
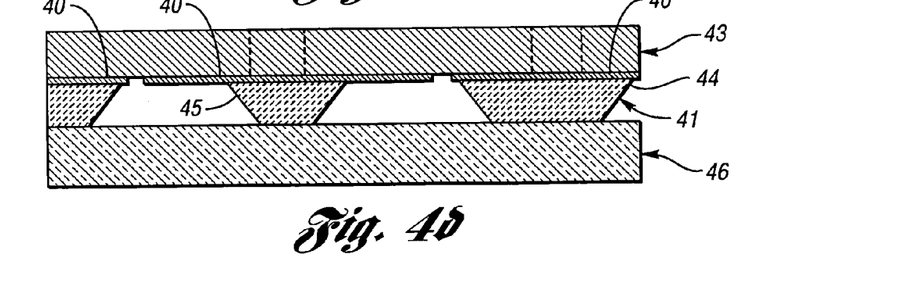
FIG. 4d illustrates a second glass wafer bonded to the silicon wafer, which wafers are diced.

One embodiment of the assembly of the present invention is fabricated in either a two or three mask process, as illustrated in FIGS. 4a–4d. The first mask defines a boron-diffused etch stop at 40 in a silicon wafer 41. Mask two patterns an oxide which defines a region 42 where silicon is etched, as shown in FIG. 4a. This silicon wafer 41 is anodically bonded to a Pyrex wafer 43, which forms the beta window, as shown in FIG. 4b. The silicon is etched, forming structural offsets, and boron-doped anodes and cathodes 44 and 45, respectively, as shown in FIG. 4c. The stack is diced and bonded to a second glass wafer 46, providing the capability of gas packaging as shown in FIG. 4d.

Experimental Results

Figure 5:
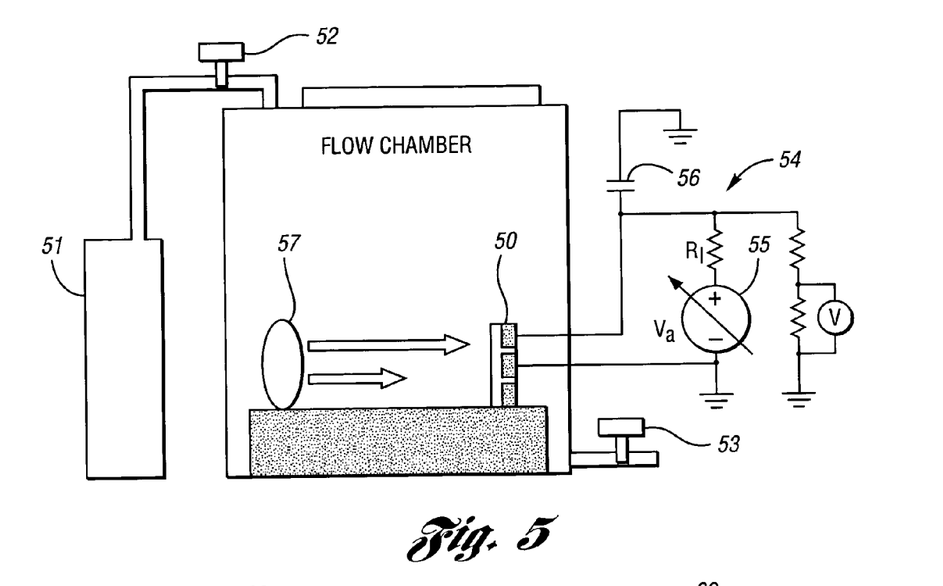
FIG. 5 is a schematic view of a test setup including an interface circuit wherein a tank allows for helium filling and pulse discharge measurement; it is to be understood that embodiments of assemblies of the present invention have gas sealed therein and do not require such a chamber.

Unsealed devices such as device 50 were tested in a flow chamber to permit the comparison of various fill gases, as shown in FIG. 5. The background gas flows into the device 50 through input ports machined into the glass window or wafer. The gases which were evaluated include He, Ne, and a He/Air gas mixture. Helium stored in tank 51 and regulated by regulator 52 and outgas regulator 53 was chosen for its lower ionization energy; this allows a larger current pulse at microscale dimensions. Neon also has a lower ionization energy, but does not leak through metal.

As shown in FIG. 5, an interface circuit, generally indicated at 54, includes a DC power supply 55 that charges a capacitor 56 which powers or biases the anode of the device 50; the cathode of the device 50 is grounded. A uranium ore sample or beta source 57 was used to test the devices. For all uranium tests, a He/Air gas mixture was used as the background fill gas.

As the thickness of the window increases, more beta radiation is absorbed before it reaches the encapsulated gas as the glass thickness is increased. Consequently, standard glass wafers from 500 μm–750 μm can be utilized for fabrication of the assembly.

As the discharge capacitor 56 that powers the assembly is charged to increasing voltages, the charge delivered in each pulse increases, however, the final voltage on the discharge capacitor 56 after ignition remains fairly constant. This provides evidence that a self-sustaining discharge is created in the device 50 that terminates when the capacitor 56 reaches a certain voltage. This mechanism amplifies the output signal. Also, the series, discharge capacitor 56 limits the avalanche breakdown.

The voltage bias scheme of the device 50 or assembly is such that the anode and cathode may be powered with a DC, AC or pulsed power source. The magnitude of voltage bias applied can allow two regimes of operation. A higher voltage allows a continuous, self-sustaining electric discharge. A lower voltage permits an avalanche breakdown that is self-terminating. The second regime provides a signal in the form of a voltage or current "pulse" for which the height and structural form can be analyzed to provide information regarding the type, energy, and flux of radiation.

Helium provides the lowest operating voltages but can be difficult to package long term, as it leaks through metal. Neon eliminates this problem with only a slight increase in operating voltage. He/Air mixtures provide a much wider range of allowed voltages, however the counting rate becomes a function of the operating voltage.

One embodiment of an assembly of the device was found to measure beta radiation produced from Uranium-238 $^{90}$Sr, $^{60}$Co, and $^{204}$Tl, all beta-emitting isotopes. Counting rates of up to 24 counts per minute were measured, and were found to fall as the source moved away in distance with similarity to a laboratory grade Geiger counter. He and Ne were evaluated as background gases, as they provide a reduced operating voltage. The voltage required for a He/Air mixture is higher, but it provides a larger range of biasing.

Figure 11:
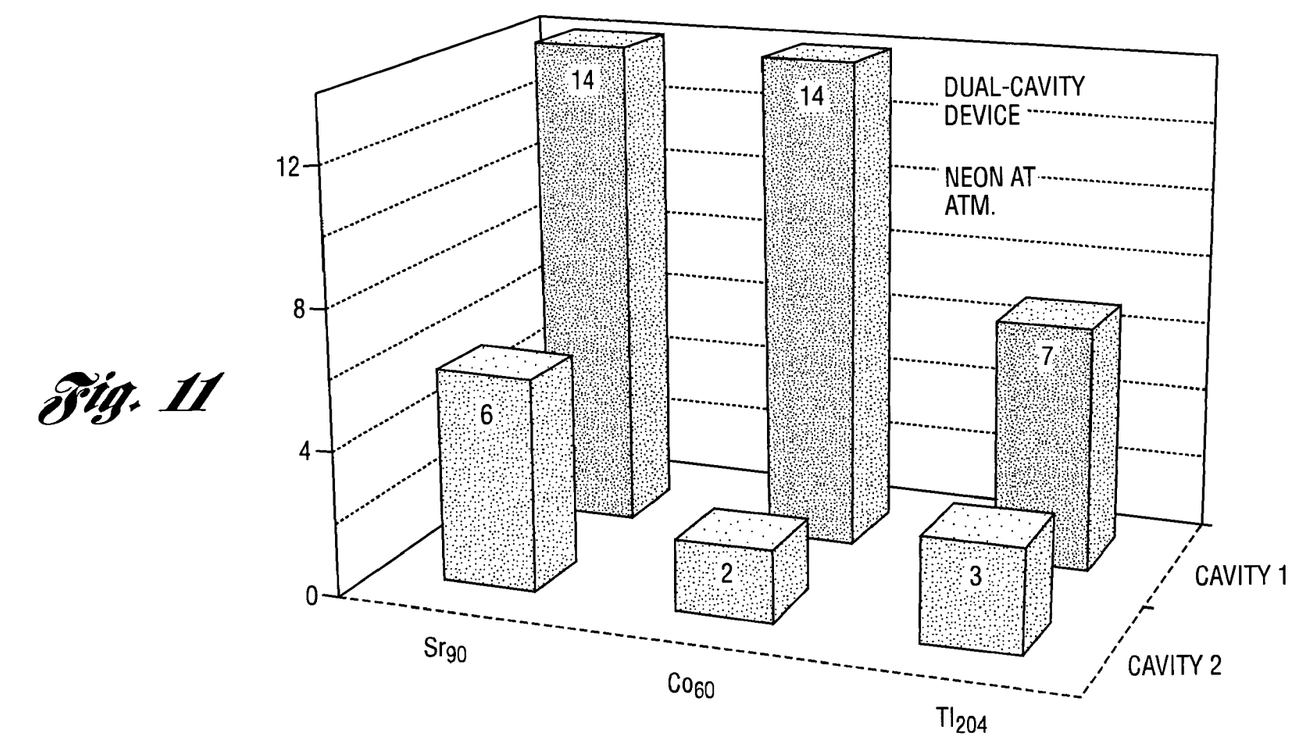
FIG. 11 is a 3-D graph which illustrates spectroscopic operation of the assembly of FIG. 10.

Referring now to FIGS. 6a–6d, 7a–7e, 8a–8b, and 9a–9d, a process flow for constructing a second embodiment of microfabricated radiation detector assembly of the present invention is disclosed. The assembly is capable of operating spectroscopically as shown in the graph of FIG. 11. The steps for forming this embodiment are outlined below with reference to these Figures.

Figure 6A:
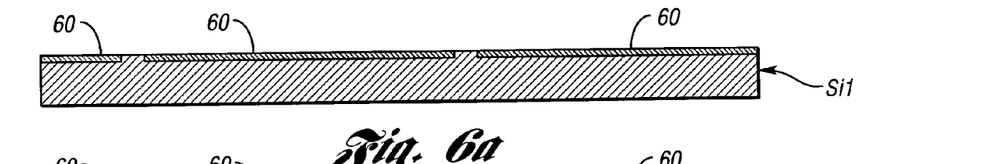
FIG. 6a shows the selective diffusion of boron into a p-type wafer.

Step 1a: Selectively Diffuse Boron Into P Wafer (FIG. 6a)

The wafers used to produce Si1 are 100 mm, <100> orientation wafers, 2-side polished, resistivity 1–10, thickness 475±5%.

Wafers Si1 and Si2 are duplicates, the same mask and process is done.

Wafers Si1 and Si2 are wet oxidized 1 micron deep. Both sides of each wafer Si1 or Si2 are coated with photoresist to protect oxide. Wafer is photoresist patterned on one side with the p++ silicon mask, aligned to the <100> primary flat.

Oxide is selectively removed with an HF dip. Photoresist is removed.

Boron is diffused 8 microns deep selectively at 60 into the wafer Si1.

Oxide is removed.

Figure 6B:
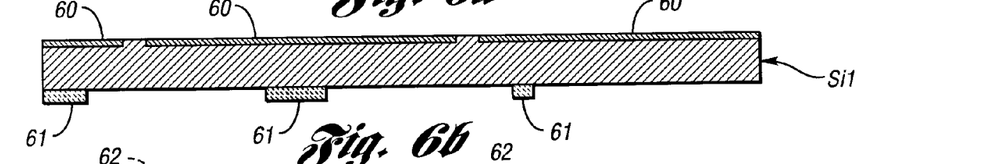
FIG. 6b shows the patterning of oxide for silicon etching.

Step 1b: Pattern Oxide for Silicon Etching (FIG. 6b)

Note: Anodic bonding, as noted later, works with one micron of oxide on the electrode end of the silicon during bonding.

Remove all borosilicate glass, grow 1 micron oxide, pattern at 61.

Figure 6C:
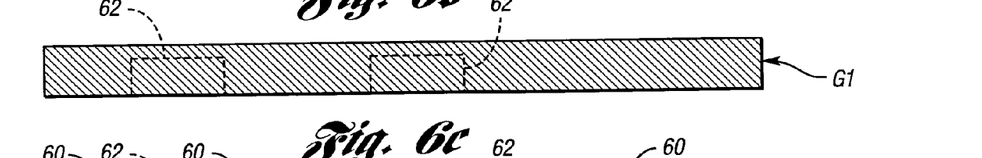
FIG. 6c shows the production of indents on a Pyrex glass wafer.

Step 1c: Produce Indents on G1 Wafer (FIG. 6c)

Note: Depending upon the isotope to be detected, wafer G2 may have indents at 62, G1 may have indents, or both G1 and G2 may have indents.

Post-style electroplated metal structures are fabricated using the glass 1 mask. Using this structure, the glass G1 is ultrasonically milled to the desired depth in the glass G1.

These structures are not complete donuts, so that during fabrication, if a pressure chamber is formed and the p++ silicon layer is ruptured, there will still be electrical continuity.

Figure 6D:
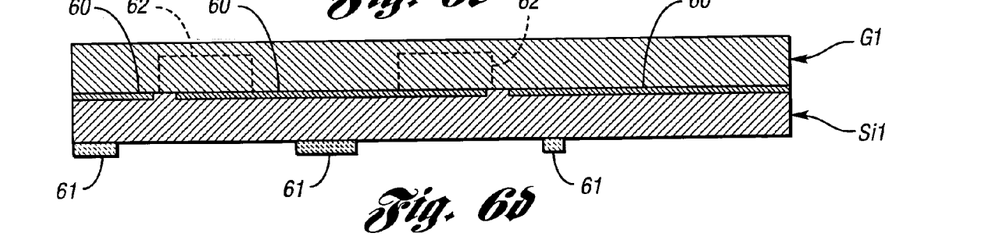
FIG. 6d shows bonding of the Pyrex and silicon wafers.
Figure 7A:
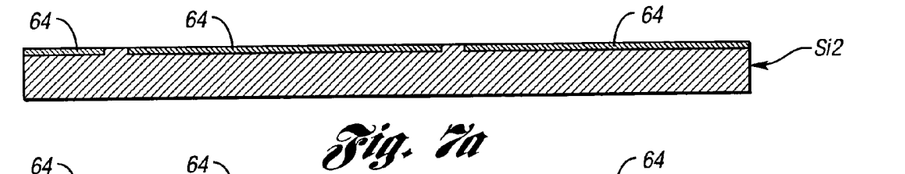
Figure 7B:
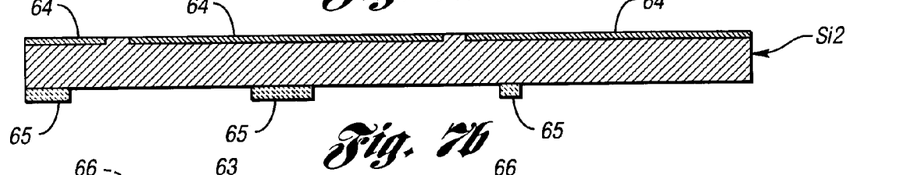
Figure 7C:
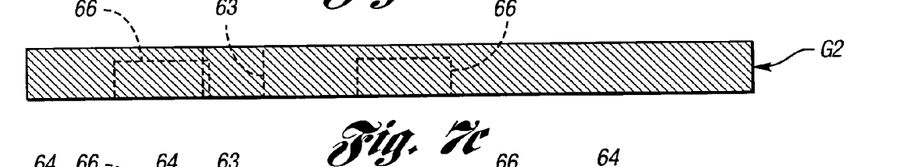
Figures 7D, 7E:
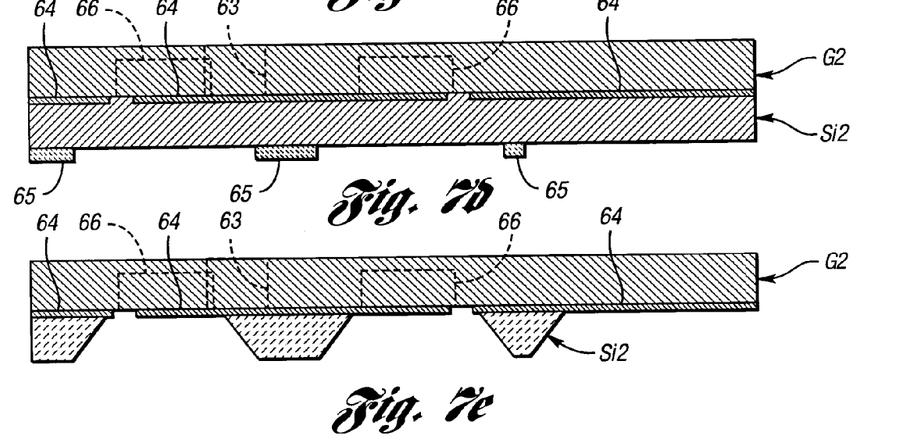

Step 1d: Anodic Bonding of Wafers (FIG. 6d)

The wafers G1 and Si1 are anodically bonded using the EV bonder, 1000V. The wafers G1 and Si1 are aligned visually aligning the formed depressions to the p++ silicon regions, and also to backside alignment marks on the patterned oxide.

Step 1e: Etch Silicon, Remove Oxide

Note: There is an exhaustive process involved in getting certified for EDP etching. As the thickness of the boron layer is not critical, TMAH etching is proposed.

Step 1f. Deposit and Pattern Gold-Silicon

Gold silicon eutectic is deposited through a lift-off process.

Steps 2a–2e are Identical to 1a–1e to Form Diffused Areas 64 and Oxide 65 and Indents 66, Except for the Existence of a Through-Hole 63 on the Glass Wafer G2 (FIGS. 7a–7e)

Figure 8A:
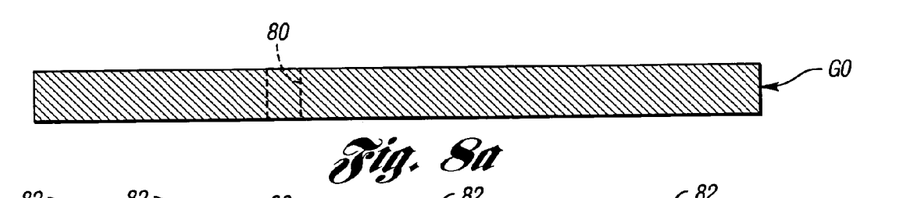
FIG. 8a shows the formation of a hole in the glass wafer or substrate, G0.

Step 3a: Process Hole in Glass Substrate G0 (FIG. 8a)

A hole 81 is individually ultrasonically or diamond-drilled in glass substrate.

Figure 8B:
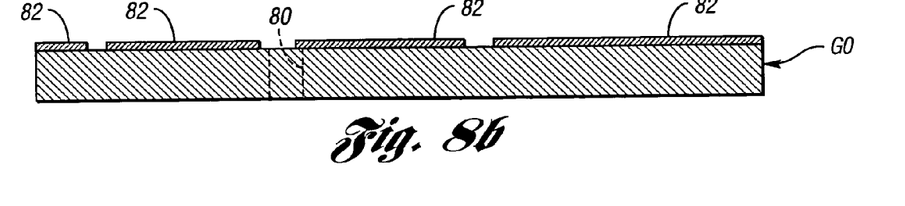
FIG. 8b shows the patterning of gold eutectic on the wafer, G0.

Step 3b: Pattern Gold Eutectic 82 (FIG. 8b)

Patterned with lift-off process, aligned to hole 80.

Figure 9A:
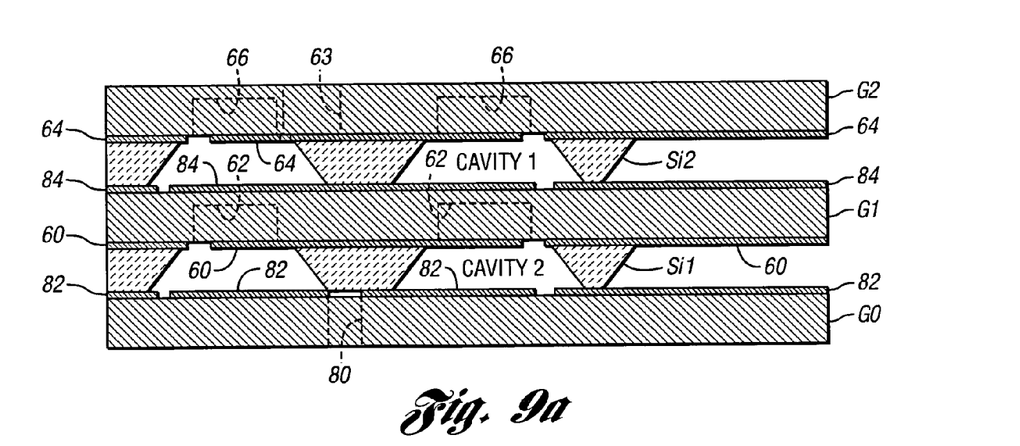
FIG. 9a is a side sectional view of the next step in the process flow wherein the entire stack of wafers, G0, Si1, G1, Si2 and G2, is gold eutectic thermo compression bonded.

Step 4a: Bond the Stack (FIG. 9a)

The entire stack is gold eutectic thermo compression bonded. Gold eutectic 84 is patterned on G1. The final eutectic bonds form the two differential cavities. Multiple cavities could be formed with varying window thicknesses.

Figure 9B:
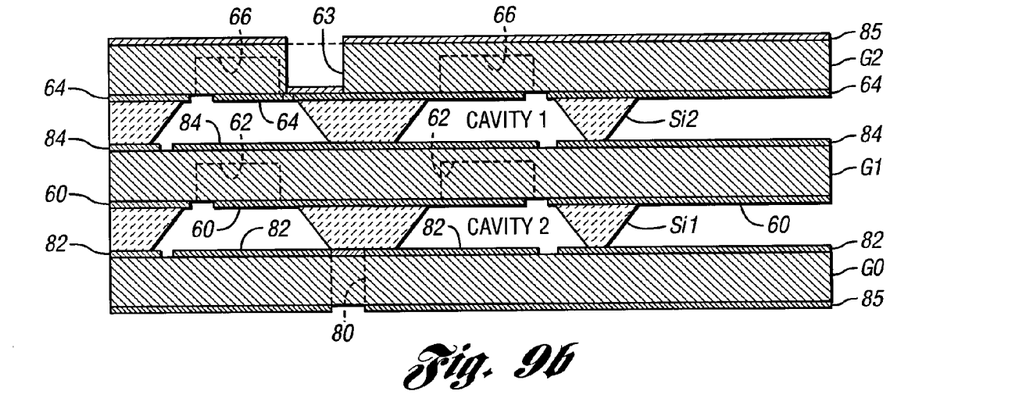
FIG. 9b is a side sectional view of the next step in the process flow wherein both sides of the bonded stack of wafers of FIG. 9a are sputtered with metal.

Step 4b: Metal Sputter (FIG. 9b)

Figure 10:
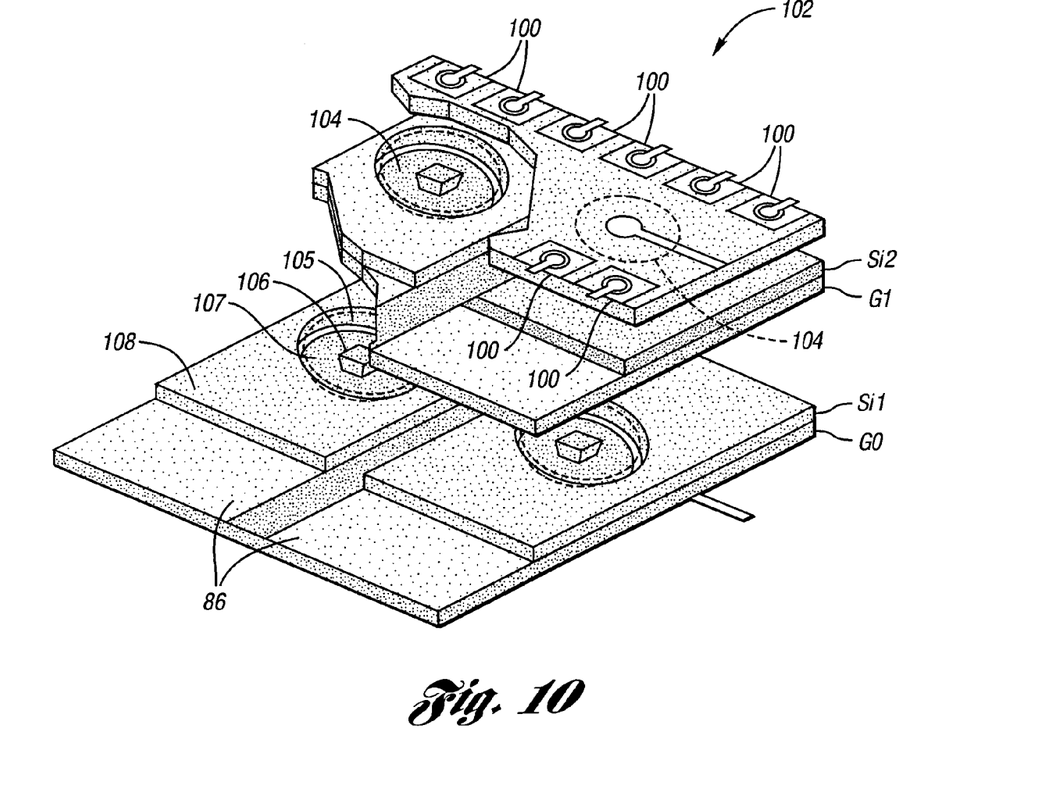
FIG. 10 is a perspective schematic view, partially broken away, of the completed assembly which is capable of operating spectroscopically and which further includes pixel anode-cathode electrodes to provide spatial imaging of charged particle flux.

Both sides are sputtered with Cr/gold 85 for p++ silicon contact. Sputtered metal on both sides allows the top side to be patterned with additional spatial detectors 100, as shown in FIG. 10.

Figure 9C:
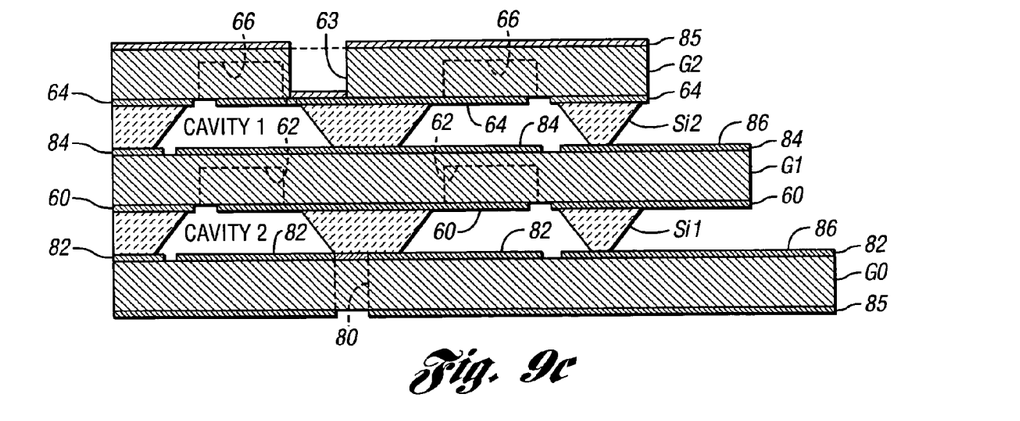
FIG. 9c is a side sectional view of the next step in the process flow wherein the wafer stack of FIG. 9b is diced to varying depths for pad contact.

Step 4c: Dicing the Stack (FIG. 9c)

Each die is separately diced in three different places, for pad contact. The wafer stack is diced to varying depths. As there are gaps due to the removed silicon, this releases metal areas 86 where wires can be bonded to the structure.

Step 4d: Filling the Device (FIG. 9d)

Indium solder of two different temperatures are heated in a vapor-locked neon gas flow chamber. Two solder balls 88 (or plugs) of different temperatures are used to encapsulate the gas.

FIG. 10 is a schematic, perspective view of the assembly, generally indicated at 102, of the second embodiment and also includes the pixel anode-cathode electrodes which form pixelated structures or detectors 100 on an outer surface of a housing of the assembly to provide spatial imaging of the beta particle flux. Locally etched glass windows are indicated at 104. A p++ silicon cathode is indicated at 105. A silicon cathode is indicated at 106. A metal cathode is indicated at 107, and a silicon anode is indicated at 108.

FIG. 11 is a graph which shows how the assembly of FIG. 10 (i.e., dual cavity device filled with neon at atmospheric pressure) is capable of operating spectroscopically.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A microfabricated radiation detector assembly comprising:
   a micromachined charged particle detector including a set of spaced-apart electrodes and an ionization gas between the electrodes; and
   a housing having a chamber for housing the detector including the gas and a charged particle transparent window which allows passage of incident charged particles therethrough to ionize the gas to create electrons which, in turn, create an electron cascade in the gas between the electrodes when the set of electrodes is biased wherein the set of electrodes divides the chamber into drift and amplification electrostatic regions when biased and wherein the drift electrostatic region is substantially larger than the amplification electrostatic region.

2. The assembly as claimed in claim 1, wherein the charged particles are beta particles and the charged particle detector is a beta radiation detector.

3. The assembly as claimed in claim 1 wherein the electrostatic regions are ring-shaped.

4. The assembly as claimed in claim 3, wherein the set of electrodes includes an inner cathode and an outer anode.

5. The assembly as claimed in claim 1, wherein charged particle detector includes a semiconductor wafer micromachined to form the electrodes.

6. The assembly as claimed in claim 5, wherein the housing includes at least one glass wafer connected to the semiconductor wafer to seal the ionization gas in the chamber and wherein the window is a glass window.

7. The assembly as claimed in claim 1, wherein the ionization gas in the chamber includes one or more gases.

8. The assembly as claimed in claim 7, wherein the one or more gases are at atmospheric pressure.

9. The assembly as claimed in claim 1, wherein the assembly is lithographically microfabricated.

10. A microfabricated radiation detector assembly comprising:
    a micromachined charged particle detector including a set of spaced-apart electrodes and an ionization gas between the electrodes;
    a housing having a chamber for housing the detector including the gas and a charged particle transparent window which allows passage of incident charged particles therethrough to ionize the gas to create electrons which, in turn, create an electron cascade in the gas between the electrodes when the set of electrodes is biased; and pixelated structures formed on an outer surface of the housing to provide spatial imaging of charged particle flux.

11. A microfabricated radiation detector assembly capable of operating spectroscopically, the assembly comprising:
    a plurality of micromachined charged particle detectors, each of the detectors including a set of spaced-apart electrodes and an ionization gas between the electrodes; and
    a housing having a plurality of chambers for housing the detectors including the gas and a plurality of charged particle transparent windows which allows passage of incident charged particles therethrough to ionize the gas to create electrons which, in turn, create electron cascades in the gas between each set of electrodes when the sets of electrodes are biased.

12. The assembly as claimed in claim 11, wherein each set of spaced apart electrodes divides one of the chambers into drift and amplification electrostatic regions when biased.

13. The assembly as claimed in claim 12, wherein the electrostatic regions are ring-shaped.

14. The assembly as claimed in claim 13, wherein each set of electrodes includes an inner cathode and an outer anode.

15. The assembly as claimed in claim 12, wherein each drift electrostatic region is substantially larger than each amplification electrostatic region.

16. The assembly as claimed in claim 11, wherein the charged particles are beta particles and each of the charged particle detectors is a beta radiation detector.

17. The assembly as claimed in claim 11, wherein each detector includes a semiconductor wafer micromachined to form one of the sets of electrodes.

18. The assembly as claimed in claim 17, wherein the housing includes at least one glass wafer connected to each semiconductor wafer to seal the ionization gas in the chambers and wherein the windows are glass windows.

19. The assembly as claimed in claim 11, wherein the ionization gas in each of the chambers includes one or more gases.

20. The assembly as claimed in claim 19, wherein the one or more gases are at atmospheric pressure.

21. The assembly as claimed in claim 11, wherein the assembly is lithographically micro fabricated.

22. The assembly as claimed in claim 11, further comprising pixelated structures formed on an outer surface of the housing to provide spatial imaging of charged particle flux.

23. The assembly as claimed in claim 11, wherein the chambers and the windows of the housing are arranged to sequentially allow passage of charged particles therethrough.

24. The assembly as claimed in claim 11, wherein the chambers and the windows are arranged to allow the passage of incident charged particles therethrough in parallel.

25. A method for detecting charged particles, the method comprising:
   positioning a micromachined radiation detector assembly to receive the charged particles, the assembly including:
      a micromachined charged particle detector including a set of spaced-apart electrodes and an ionization gas between the electrodes; and
      a housing having a chamber for housing the detector including the gas and having a charged particle transparent window which allows passage of incident charged particles therethrough to ionize the gas to create electrons wherein the set of electrodes divides the chamber into drift and amplification electrostatic regions when biased and wherein the drift electrostatic region is substantially larger than the amplification electrostatic region;
   biasing the set of electrodes at a level which creates a signal which can be analyzed to provide information regarding the charged particles.

26. The method of claim 25, wherein the step of biasing is performed with a DC power source.

27. The method of claim 25, wherein the step of biasing is performed with an AC power source.

28. The method of claim 25, wherein the step of biasing is performed with a pulsed power source.

29. A method of operating a micromachined radiation detector assembly, the method comprising:
   providing a microfabricated radiation detector assembly including:
      a micromachined charged particle detector including a set of spaced-apart electrodes and an ionization gas between the electrodes; and
      a housing having a chamber for housing the detector including the gas and having a charged particle transparent window which allows passage of incident charged particles therethrough to ionize the gas to create electrons wherein the set of electrodes divides the chamber into drift and amplification electrostatic regions when biased and wherein the drift electrostatic region is substantially larger than the amplification electrostatic region; and
   biasing the set of electrodes at a level which allows a continuous, self-sustaining electric discharge between the electrodes.

30. The method of claim 29, wherein the step of biasing is performed with a DC power source.

31. The method of claim 29, wherein the step of biasing is performed with an AC power source.

32. The method of claim 29, wherein the step of biasing is performed with a pulsed power source.

33. A method of making a radiation detector assembly, the method comprising:
   providing a plurality of wafers including at least one semiconductor wafer and a charged particle transparent wafer;
   micromachining the at least one semiconductor wafer to obtain at least one micromachined wafer including at least one set of spaced-apart electrodes;
   filling space between the electrodes with an ionization gas;
   bonding the wafers including the at least one micromachined wafer and the charged particle transparent wafer together to form the assembly; and
   forming pixelated structures on an outer surface of an outer wafer of the assembly.

34. The method of claim 33, wherein the step of filling is performed after the step of bonding.

35. A method of making a radiation detector assembly, the method comprising:
   providing a plurality of wafers including at least one semiconductor wafer and a charged particle transparent wafer;
   micromachining the at least one semiconductor wafer to obtain at least one micromachined wafer including at least one set of spaced-apart electrodes;
   filling space between the electrodes with an ionization gas; and
   bonding the wafers including the at least one micromachined wafer and the charged particle transparent wafer together to form the assembly wherein the plurality of wafers includes at least one charged particle transparent glass wafer and wherein the method further comprises forming a hole through the at least one glass wafer to fluidly communicate the ionization gas with the space between the electrodes.

36. The method of claim 35 further comprising preventing flow of ionization gas from the space between the electrodes after the step of filling.

* * * * *